3,270,006
CERTAIN 3H-AZEPINE COMPOUNDS AND
THEIR PREPARATION
Leo A. Paquette, Portage Township, Kalamazoo County, Mich., assignor to The Upjohn Company, Inc., Kalamazoo, Mich., a corporation of Delaware
No Drawing. Original application Aug. 30, 1963, Ser. No. 305,850, now Patent No. 3,213,098, dated Oct. 19, 1965. Divided and this application June 21, 1965, Ser. No. 479,026
6 Claims. (Cl. 260—239)

This is a division of application Serial No. 305,850, filed August 30, 1963, now U.S. Patent 3,213,098.

This invention relates to novel compositions of matter and to methods for producing them. In particular, this invention relates to the free base form and acid addition salts of novel amino-substituted 3H-azepines of the formula:

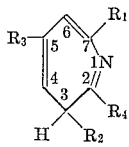

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 lower alkyls, inclusive, and wherein the nitrogen atom of $R_4$ is the point of attachment of $R_4$ to the ring in said formula. The several alkyl groups which are or can be associated with a compound of Formula I can all be different or any two or more of them can be alike.

Examples of alkyl of 1 to 4 carbon atoms, inclusive, are methyl, ethyl, propyl, butyl, and isomeric forms thereof. Examples of lower alkyl are methyl, ethyl, propyl, butyl, pentyl, hexyl, heptyl, octyl, and isomeric forms thereof. Examples of heterocyclic moieties within the scope of $R_4$, in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert-butylhexaheydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylmorpholino,
3,3-dimethylmorpholino,
2,6-di-tert-butylmorpholino,
3-methylthiomorpholino,
2,2-diethylthiomorpholino,
2,6-dihexylthiomorpholino, and the like.

In each of the above examples of heterocyclic moieties, the free valence, and hence the point of attachment to the ring in Formula I, is on the heterocyclic nitrogen atom.

The novel 3H-azepines of Formula I are amines and exist either in the non-protonated (free base) form or the protonated (acid addition salt) form depending on the pH of the environment. They form stable protonates, i.e., acid addition salts, on neutralization with suitable acids, for example, hydrochloric, hydrobromic, sulfuric, phosphoric, nitric, acetic, benzoic, salicyclic, glycolic, succinic, nicotinic, tartaric, maleic, malic, pamoic, methanesulfonic, cyclohexanesulfamic, picric, and lactic acids, and the like. The acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel 3H-azepines of Formula I can also be transformed to N-oxides, i.e., amine oxides, by oxidation with hydrogen peroxide, an organic or inorganic peracid, or ozone. These amine oxides are basic, form stable protonates with acids such as those listed above, and, like the corresponding amines, are useful as acid acceptors.

The novel compounds of Formula I form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I compounds of this invention also form salts with penicillins. These salts have solubility characteristics which cause them to the useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a Formula I compound, for example, the chloride ion of a hydrochloride, with the anionic form of a penicillin.

The novel free bases of Formula I are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The novel compounds of Formula I also form useful quaternary ammonium salts. For example, they form alkyl quaternary ammonium salts by reaction with an alkyl halide, for example, an alkyl chloride, bromide, or iodide, or by reaction with an alkyl nitrate, an alkali metal alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate benzoate, salicylate, hydrocinnamate, succinate, lactate, and the like.

The higher alkyl quaternary ammonium salts of the novel Formula I 3H-azepines, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula I are useful as intermediates in the preparation of said alkyl quaternary ammonium salts.

The novel Formula I 3H-azepines of this invention have also demonstrated anti-inflammatory activity as shown by the granuloma pouch technique in rats, and are useful in treating inflammatory conditions topically, locally, and systemically in mammals, e.g., humans, cattle, horses, dogs, and cats, and in birds, e.g., poultry.

The novel amino-substituted 3H-azepines of Formula I are produced by reacting an alkoxy-substituted 3H-azepine of the formula:

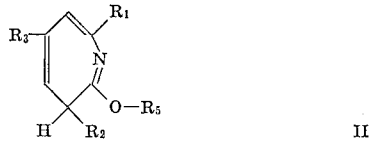

or an alkylthio-substituted 3H-azepine of the formula:

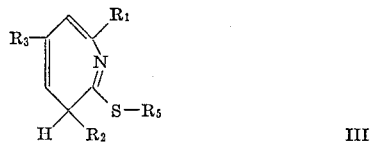

wherein $R_1$, $R_2$, and $R_3$ are as given above and wherein $R_5$ is alkyl of 1 to 4 carbon atoms, inclusive, with a member selected from the group consisting of di-lower-alkylamines and the heterocyclic amines, aziridine, azetidine, pyrrolidine, piperidine, hexahydroazepine, heptamethylenimine, octamethylenimine, morpholine, and thiomorpholine, each of said heterocyclic amines having attached as substituents on carbon atoms thereof zero to three lower alkyls, inclusive. In these reactions, the —O—$R_5$ moiety in Formula II or the —S—$R_5$ moiety in Formula III is replaced by an amino moiety, $R_4$ in Formula I, derived from the dialkylamine or the heterocyclic amine.

Alkoxy-substituted 3H-azepines of Formula II and alkylthio-substituted 3H-azepines of Formula III are novel in the art. In addition to being useful as intermediates in the production of the Formula I amino-substituted 3H-azepines, these novel compounds are useful for other purposes. For example, the Formula II cyclic imido ethers have demonstrated anti-inflammatory activity as shown by the granuloma pouch technique in rats, and are useful in treating inflammatory conditions as described above for the Formula I compounds. Tests with animals have also shown the Formula II compounds to have sedative effects and the compounds are therefore useful for that purpose. The Formula III alkylthio-substituted 3H-azepines are useful for the treatment of topical fungal infections in mammals, e.g., humans, cattle, horses, dogs, and cats, caused by such fungi as *Trichophyton rubrum*, or for eradicating such fungi from inanimate objects.

The novel alkoxy-substituted 3H-azepines of Formula II are produced by reacting a 1,3-dihydro-2H-azepine-2-one of the formula:

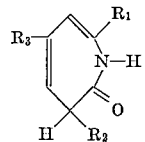

wherein $R_1$, $R_2$, and $R_3$ are as given above, with a trialkyloxonium fluoroborate wherein the alkyls each contain 1 to 4 carbon atoms, inclusive, and then mixing the resulting reaction mixture was a base.

The novel alkylthio-substituted 3H-azepines of Formula III are produced by reacting a 1,3-dihydro-2H-azepine-2-thione of the formula:

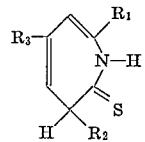

wherein $R_1$, $R_2$, and $R_3$ are as given above, with a trialkyloxonium fluoroborate wherein the alkyls each contain 1 to 4 carbon atoms, inclusive, and then mixing the resulting reaction mixture with a base.

Suitable trialkyloxonium fluoroborates for these two reactions are either known in the art or can be prepared by methods known in the art [Meerwein et al., J. prakt. Chem. 147, 257–65 (1937); ibid. 154, 83–156 (1939)].

1,3-dihydro-2H-azepin-2-ones of Formula IV are either known in the art or can be prepared by the method known in the art, i.e., by interaction of the sodium salt of a di-ortho-substituted phenol with an ethereal solution of chloramide ($ClNH_2$), preferably in the presence of an excess of the phenol [Theilacker et al., Angew. Chem. 72, 131 (1960); ibid., 75, 208–9 (1963)]. Phenols suitable for this reaction are known in the art or can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of suitable phenols are 2,6-dimethylphenol (2,6-xylenol), 2,4,6-trimethylphenol (mesitol), 2,6-diethylphenol, 2,4,6-triethylphenol, 2,6-dipropylphenol, 2,6-diisopropylphenol, 2,4,6-triisopropylphenol, 2,6-diisobutylphenol, 2,4,6-tri-tert-butylphenol, 2-ethyl-6-methylphenol, 2-methyl-6-propylphenol, 2-ethyl-6-propylphenol, 2-tert-butyl-6-methylphenol, 2-sec-butyl-6-methylphenol, 2-tert-butyl-6-ethylphenol, 2-tert-butyl-6-isopropylphenol, 2-isobutyl-6-propylphenol, 4-sec-butyl-2,6-dimethylphenol, 4-tert-butyl-2,6-dimethylphenol, 2,4-dimethyl-6-ethylphenol, 2,4-dimethyl-6-propylphenol, 6-tert-butyl-2,4-dimethylphenol, 2,6-diethyl-4-methylphenol, 2,6-diisopropyl-4-methylphenol, 2,4-di-tert-butyl-6-methylphenol, 2,6-di-tert-butyl-4-ethylphenol, 2,4-di-tert-butyl-6-propylphenol, 2,6-diisobutyl-4-propylphenol, 2,6-di-tert-butyl-4-sec-butylphenol, 2-tert-butyl-4-ethyl-6-methylphenol, 2-sec-butyl-6-isopropyl-4-methylphenol, 2-butyl-6-tert-butyl-4-methylphenol, and the like.

1,3-dihydro-2H-azepine-2-thiones of Formula V are novel in the art. In addition to being useful as intermediates in the production of Formula III alkylthio-substituted 3H-azepines, they are useful for the treatment of topical fungal infections as described above for the Formula III compounds. The compounds of Formula V also exhibit central nervous system stimulatory activity and are therefore useful in animals, e.g., in mammals including humans, cattle, horses, dogs, and cats, and in birds including poultry, as antidepressants and to improve alertness.

The novel 1,3-dihydro-2H-azepine-2-thiones of Formula V are produced by reacting a Formula IV 1,3-dihydro-2H-azepin-2-one with phosphorus pentasulfide. This reaction is carried out by mixing and heating these two reactants. The stoichiometry of this reaction is uncertain but it is thought that at least one-half mole of phosphorus pentasulfide should be reacted with each mole of 1,3-dihydro-2H-azepin-2-one. It is preferred, however, to react about equimolecular amounts of the two reactants. More phosphorus pentasulfide, for example, up to two moles or even more, can be used, and, in some instances, better yields will result thereby. This reaction is sometimes facilitated by addition of catalytic or larger amounts of an alkali metal sulfide, for example, potassium sulfide. Although an inert liquid reaction diluent is not necessary, it is preferred to use one. Suitable diluents are benzene, toluene, xylene, and the like. A preferred group of diluents are the heterocyclic organic bases, for example, pyridine, alkylpyridines, quinoline, isoquinoline, and the like. Pyridine is especially preferred as a diluent because it dissolves substantial amounts of both reactants, is relatively inert, and is miscible with water. The latter property facilitates isolation of the desired 1,3-dihydro-2H-azepine-2-thione. Reaction temperatures ranging from about 75° to about 150° C. and reaction times ranging, inversely with temperature, from about one-half to about 20 hours can usually be used. When pyridine is used as a reaction diluent, a reflux period of about 2 to about 6 hours is generally satisfactory. The desired product can be isolated by conventional techniques. When pyridine is used as a reaction diluent, it is advantageous to dilute the reaction mixture with several volumes of warm water, and then to cool the mixture. Usually the desired product is insoluble in water, and can be filtered and purified, if desired, by conventional techniques, for example, crystallization from a solvent or mixture of solvents or chromatography. When the reaction diluent is not miscible with water, it is usually satisfactory to cool the reaction mixture and to filter the crude product. Inorganic phosphorus compounds are then advantageously removed from the product by trituration with water or, preferably, an aqueous solution of a base, for example, sodium hydroxide.

As discussed above, alkoxy-substituted 3H-azepines and alkylthio-substituted 3H-azepines are produced by the reaction of trialkyloxonium fluoroborates with 1,3-dihydro - 2H-azepin - 2-ones and 1,3-dihydro - 2H-azepine-2-thiones, respectively. The reaction conditions are substantially the same for both reactions. Since the trialkyloxonium fluoroborates are relatively unstable substances, it is advantageous to prepare them just before use. There is usually no need to purify these fluoroborates before use. Otherwise, it is generally satisfactory to follow the procedures in Meerwein et al., supra, reacting epichlorohydrin with the boron trifluoride etherate corresponding to the alkyl group desired in the alkoxy or alkylthio substituent. An excess of the particular ether should also be present in the reaction mixture. It is desirable to wash the final trialkyloxonium fluoroborate with additional portions of the same ether. Since these fluoroborates react with water, it is important to use dry reactants and apparatus during their preparation and subsequent use, and to minimize contact with atmospheric moisture.

To prepare an alkoxy-substituted or alkylthio-substituted 3H-azepine, the corresponding trialkyloxonium fluoroborate is dissolved in an inert solvent, cooled, and mixed with a solution of the appropriate 1,3-dihydro-2H-azepin-2-one or 1,3-dihydro - 2H-azepine - 2-thione. The solvent should be substantially free of water, inert to the two reactants, and able to dissolve substantial amounts of both reactants. Particularly preferred as solvents are the chlorinated aliphatic hydrocarbons, for example, methylene chloride, 1,2-dichloroethane, chloroform, carbon tetrachloride, and the like. It is thought that one mole of the fluoroborate reacts with each mole of the 1,3-dihydro-2H-azepin-2-one or 1,3-dihydro - 2H-azepine-2-thione. Since it is preferred not to purify the fluoroborate before using it in this reaction, it is preferred to use a slight excess of the fluoroborate, for example, about 20 percent excess. A larger excess can be used, for example, up to about 2 to about 5 moles or even more of the fluoroborate per mole of the azepinone or azepinethione reactant, but ordinarily it is unnecessary to do so. It is preferred to cool the solution of the fluoroborate externally to about 0° to about 20° C. while adding the solution of azepinone or azepinethione slowly. The reaction is continued in the range about 20° to about 40° C. until experience indicates the reaction is complete. A total reaction time about 5 to about 30 hours is usually sufficient. It is not necessary to continue stirring during the entire reaction time. The product of this reaction is a complex substance of uncertain structure and contains fluorine and boron. This product is ordinarily not isolated. Rather, it is transformed in the reaction mixture to the desired alkoxy-substituted or alkylthio-substituted 3H-azepine by addition of a base. Suitable bases are the alkali metal and alkaline earth metal hydroxides, carbonates, and bicarbonates. Particularly preferred are the alkali metal carbonates, for example, sodium carbonate and potassium carbonate. Addition of the base, preferably as a concentrated aqueous solution, produces a precipitate, presumably one or more insoluble fluorine-boron compounds. Sufficient base is added to convert substantially all of the soluble fluorine and boron compounds into insoluble compounds. At least about one mole of the base should be added per mole of the trialkyloxonium fluoroborate originally present at the start of the reaction. It is usually satisfactory to add the concentrated aqueous base until further addition ceases to cause precipitate to form. The precipitate, usually pasty in appearance, is separated by filtration or decantation of the organic liquid. The desired alkoxy-substituted 3H-azepine or the alkylthio-substituted 3H-azepine is then isolated by conventional techniques, for example, drying followed by evaporation of the organic solvent. The product can be purified, if desired, by distillation at reduced pressure or by chromatography.

The alkoxy-substituted 3H-azepine (Formula II) or the alkylthio-substituted 3H-azepine (Formula III) is transformed to the corresponding amino-substituted 3H-azepine (Formula I) by reaction with a secondary amine. Examples of suitable dilower-alkylamines for this purpose are dimethylamine, N-methylethylamine, diethylamine, N-methylpropylamine, N-ethylpropylamine, dipropylamine, N-methylisopropylamine, disopropylamine, N-ethylbutylamine, N-propyl-sec-butylamine, N-methylpentylamine, N-ethylisopentylamine, dipentylamine, N-propyl-2-methylbutylamine, dihexylamine, dioctylamine, and the like. Examples of suitable heterocyclic amines for this purpose are aziridine, 2-methylaziridine, 2-ethylaziridine, 2-butylaziridine, 2,3-dimethylaziridine, 2,2-dimethylaziridine, azetidine, 2-methylazetidine, 3-methylazetidine, 2-octylazetidine, 2,2-dimethylazetidine, 2,4,4-trimethylazetidine, pyrrolidine, 2-methyl-pyrrolidine, 3-butylpyrrolidine, 2-isohexylpyrrolidine, 2,3-dimethylpyrrolidine, 2,2 - diethylpyrrolidine, 2,3,5 - trimethylpyrrolidine, 3,4 - dioctylpyrrolidine, piperidine, 2-methyl-piperidine, 3-methylpiperidine, 4-methylpiperidine, 3-isopropylpiperidine, 4-tert-butyl-piperidine, 2-methyl-5-ethyl-piperidine, 3,5-dipentylpiperidine, 2,6-dimethyl-4-octylpiperidine, hexahydroazepine, 2-ethylhexahydroazepine, 3-heptylhexahydroazepine, 2,4-dimethylhexahydroazepine, 3,3-diethylhexahydroazepine, 2,4,6 - tripropylhexahydroazepine, heptamethylenimine, 5-butylheptamethylenimine, 2,4-diisopropylheptamethylenimine, 2,5,8-trimethylheptamethylenimine, octomethylenimine, 3-methyloctamethylenimine, 2,9 - diethyloctamethylenimine, morpholine, 2 - ethylmorpholine, 2 - methyl - 5 - ethylmorpholine, 3,3-dimethylmorpholine, thiomorpholine, 2,6-dihexylthiomorpholine, and the like.

The secondary amine and the alkoxy-substituted or alkylthio-substituted 3H-azepine are mixed and heated. Although an inert reaction diluent can be used, for example, toluene, dioxane, or xylene, it is preferred to use an excess of the amine as a diluent when the amine is a liquid at the temperature of the reaction. At least one mole of the amine should be reacted with each mole of the 3H-azepine. When excess amine is to serve as a diluent, about 2 to about 10 moles or even more amine should be used. A reaction temperature range about 50° to about 200° C. is usually satisfactory, a range about 75° to about 150° C. being preferred. The reaction time varies inversely with temperature, ordinarily ranging from about 25 to about 200 hours. Amines of relatively low boiling point are likely to escape from the reaction flask during heating. An example is dimethylamine. When using such amines, it is often advantageous to carry out the reaction in a sealed autoclave. The desired amino-substituted 3H-azepine can be isolated by conventional techniques, for example, fractional distillation of the reaction mixture at reduced pressure. The product can be purified, if desired, by further fractional distillation or by chromatography.

The free base form of a Formula I amino-substituted 3H-azepine is produced by the above reaction between a secondary amine and an alkoxy-substituted or alkylthio-substituted 3H-azepine. These bases can be transformed to acid addition salts by neutralization with the appropriate amount of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing an equivalent amount of the acid, and thereafter, the water can be removed by evaporation. If the acid is soluble in a relatively non-polar solvent, for example, diethyl ether or diisopropyl ether, separate solutions of the acid and the Formula I compound in such a solvent can be mixed in equivalent amounts, whereupon the acid addition salt will usually precipitate because of its relatively low solubility in the non-polar solvent. Alternatively, the basic Formula I compound can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. When the acid addition salt is a solid, it can be purified readily by recrystallization from a suitable solvent or mixture of solvents. The acid addition salt can be transformed back to the free base by treatment with a base, e.g., sodium hydroxide. In some instances, the Formula I compound is more easily purified in acid addition salt form than in free base form. Transformation back to the free base form thus completes a means of obtaining a particularly pure free base.

The invention can be more fully understood by the following examples.

*Example 1.—1,3-dihydro-3,5,7-trimethyl-2H-azepin-2-one*

Following the procedure of Theilacker et al., supra, the sodium salt of 2,4,6-trimethylphenol was reacted with chloramide in the presence of an excess of this phenol. 1,3 - dihydro - 3,5,7 - trimethyl-2H-azepin-2-one was obtained; M.P. 132° C.

Following the procedure of Example 1 but substituting for the 2,4,6-trimethylphenol, 2,6-dimethylphenol;
2,6-diethylphenol;
2,6-dipropylphenol;
2,6-diisopropylphenol;
2,6-diisobutylphenol;
2,6-dibutylphenol;
2,4,6-triethylphenol;
2,6-diethyl-4-methylphenol;
2,6-dimethyl-4-ethylphenol;
4-tert-butyl-2,6-dimethylphenol;
2,6-diisopropyl-4-methylphenol;
2,6-diisobutyl-4-propylphenol;
4-sec-butyl-2,6-dimethylphenol; and
2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one, respectively.

*Example 2.—1,3-dihydro-3,5,7-trimethyl-2H-azepine-2-thione*

A solution of 1,3-dihydro-3,5,7-trimethyl-2H-azepin-2-one (45.3 g.; 0.30 mole) and phosphorus pentasulfide (78.0 g.; 0.35 mole) in 450 ml. of pyridine was refluxed with stirring for 3 hours. The resulting warm solution was poured into 1500 ml. of water at about 75° C. The solid which precipitated on cooling was filtered, washed with water, dried, and dissolved in 100 ml. of methylene chloride. This solution was adsorbed on a 3000-g. column of Florisil (60–100 mesh; a magnesium trisilicate; obtained from the Floridin Company, Tallahassee, Florida). The column was eluted with about 10 l. of a mixture of 9 volumes of hexane and one volume of acetone. Evaporation of the eluate gave a pale yellow solid which was recrystallized from a mixture of ethyl acetate and hexane to give 22.1 g. of 1,3-dihydro-3,5,7-trimethyl-2H-azepine-2-thione; M.P. 136.5–137° C. Three additional recrystallizations from a mixture of ethyl acetate and hexane gave the same substance in the form of pale yellow needles; M.P. 136.5–137° C.

*Analysis.*—Calcd. for $C_9H_{13}NS$: C, 64.62; H, 7.83; N, 8.37; S, 19.17. Found: C, 65.00; H, 7.79; N, 8.24; S, 19.37. U.V. (ethanol) 244 m$\mu$ ($\epsilon$=8,150); 310 m$\mu$ ($\epsilon$=13,450); sh 364 m$\mu$ ($\epsilon$=1,050).

Following the procedure of Example 2 but substituting for the 1,3-dihydro-3,5,7-trimethyl-2H-azepin-2-one,
1,3-dihydro-3,7-dimethyl-2H-azepin-2-one;

1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one, there are obtained 1,3-dihydro-3,7-dimethyl-2H-azepine-2-thione;
1,3-dihydro-3,7-diethyl-2H-azepine-2-thione;
1,3-dihydro-3,7-dipropyl-2H-azepine-2-thione;
1,3-dihydro-3,7-diisopropyl-2H-azepine-2-thione;
1,3-dihydro-3,7-diisobutyl-2H-azepine-2-thione;
1,3-dihydro-3,7-dibutyl-2H-azepine-2-thione;
1,3-dihydro-3,5,7-triethyl-2H-azepine-2-thione;
1,3-dihydro-3,7-diethyl-5-methyl-2H-azepine-2-thione;
1,3-dihydro-3,7-dimethyl-5-ethyl-2H-azepine-2-thione;
1,3-dihydro-5-tert-butyl-3,7-dimethyl-2H-azepine-2-thione;
1,3-dihydro-3,7-diisopropyl-5-methyl-2H-azepine-2-thione;
1,3-dihydro-3,7-diisobutyl-5-propyl-2H-azepine-2-thione;
1,3-dihydro-5-sec-butyl-3,7-dimethyl-2H-azepine-2-thione; and
1,3-dihydro-3,5,7-triisopropyl-2H-azepine-2-thione, respectively.

*Example 3.—2-ethoxy-3,5,7-trimethyl-3H-azepine*

Epichlorohydrin (44.4 g.; 0.48 mole) was added dropwise with stirring to a solution of freshly redistilled boron trifluoride diethyl etherate (91 g.; 0.64 mole) in 300 ml. of anhydrous diethyl ether. Atmospheric moisture was excluded and the addition was carried out at a rate sufficient to maintain gentle reflux. The mixture was then stirred and allowed to cool to about 25° C. during 2 hours. The liquid portion of the resulting mixture was decanted, and the solid triethyloxonium fluoroborate was washed thoroughly with diethyl ether and then dissolved in about 50 ml. of dried methylene chloride. The latter solution was stirred at 10–15° C. during dropwise addition of a solution of 1,3-dihydro-3,5,7-trimethyl-2H-azepin-2-one (60.4 g.; 0.40 mole) in 200 ml. of dried methylene chloride. The resulting mixture was stirred 2 hours at 25° C. and then was allowed to stand about 18 hours at 25° C. Stirring was again started and 76 g. of 50% aqueous potassium carbonate solution was added slowly. The pasty solid which precipitated was removed by filtration. The filtrate was dried and evaporated, and the residual oil was distilled at reduced pressure to give 59.8 g. of a colorless liquid; B.P. 86–91° C. at 13 mm.; $n_D^{24}$ 1.4940. Redistillation gave 2-ethoxy-3,5,7-trimethyl-3H-azepine; B.P. 57° C. at 0.1 mm.; $n_D^{26}$ 1.4946.

*Analysis.*—Calcd. for $C_{11}H_{17}NO$: C, 73.70; H, 9.56; N, 7.81. Found: C, 73.73; H, 9.58; N, 7.79. U.V. (ethanol) 257 mμ (ε=6,300).

Following the procedure of Example 3 but using in place of triethyloxonium fluoroborate,
trimethyloxonium fluoroborate;
tripropyloxonium fluoroborate;
triisopropyloxonium fluoroborate;
tributyloxonium fluoroborate; and
triisobutyloxonium fluoroborate, there are obtained 2-methoxy-3,5,7-trimethyl-3H-azepine;
2-propoxy-3,5,7-trimethyl-3H-azepine;
2-isopropoxy-3,5,7-trimethyl-3H-azepine;
2-butoxy-3,5,7-trimethyl-3H-azepine; and
2-isobutoxy-3,5,7-trimethyl-3H-azepine, respectively. Each of the above trialkyloxonium fluoroborates is prepared according to Meerwein et al., supra.

Following the procedure of Example 3 but substituting for the particular combination of triethyloxonium fluoroborate and 1,3-dihydro-3,5,7-trimethyl-2H-azepin-2-one used therein, trimethyloxonium fluoroborate plus
1,3-dihydro-3,7-dimethyl-2H-azepin-2-one;
tripropyloxonium fluoroborate plus
1,3-dihydro-3,7-diethyl-2H-azepin-2-one;
triisopropyloxonium fluoroborate plus
1,3-dihydro-3,7-diisopropyl-2H-azepin-2-one;
tributyloxonium fluoroborate plus
1,3-dihydro-3,7-dibutyl-2H-azepin-2-one;
triisobutyloxonium fluoroborate plus
1,3-dihydro-3,5,7-triethyl-2H-azepin-2-one;
trimethyloxonium fluoroborate plus
1,3-dihydro-3,7-diethyl-5-methyl-2H-azepin-2-one;
triethyloxonium fluoroborate plus
1,3-dihydro-3,7-dimethyl-5-ethyl-2H-azepin-2-one;
tripropyloxonium fluoroborate plus
1,3-dihydro-5-tert-butyl-3,7-dimethyl-2H-azepin-2-one; and
tributyloxonium fluoroborate plus
1,3-dihydro-3,5,7-triisopropyl-2H-azepin-2-one, there are obtained 2-methoxy-3,7-dimethyl-3H-azepine;
2-propoxy-3,7-diethyl-3H-azepine;
2-isopropoxy-3,7-diisopropyl-3H-azepine;
2-butoxy-3,7-dibutyl-3H-azepine;
2-isobutoxy-3,5,7-triethyl-3H-azepine;
2-methoxy-3,7-diethyl-5-methyl-3H-azepine;
2-ethoxy-3,7-dimethyl-5-ethyl-3H-azepine;
2-propoxy-5-tert-butyl-3,7-dimethyl-3H-azepine; and
2-butoxy-3,5,7-triisopropyl-3H-azepine, respectively.

*Example 4.—2-ethylthio-3,5,7-trimethyl-3H-azepine*

Triethyloxonium fluoroborate was prepared from epichlorohydrin (11.1 g.; 0.12 mole), boron trifluoride diethyl etherate (22.8 g.; 0.16 mole), and diethyl ether (75 ml.) according to Example 3, and was dissolved in 50 ml. of dried methylene chloride. This solution was stirred at 10–15° C. during dropwise addition of a solution of 1,3-dihydro-3,5,7-trimethyl-2H-azepine-2-thione (16.7 g.; 0.10 mole) in 100 ml. of dried methylene chloride. The resulting solution was stirred 2 hours at 25° C. and then was allowed to stand about 18 hours at 25° C. Stirring was again started and 19 g. of 50% aqueous potassium carbonate solution was added slowly. The pasty solid which precipitated was removed by filtration. The filtrate was dried and evaporated, and the residual oil was distilled at reduced pressure to give 9.2 g. of a colorless liquid; B.P. 72–74° C. at 0.2 mm.; $n_D^{26}$ 1.5462. Redistillation gave 2-ethylthio-3,5,7-trimethyl-3H-azepine; B.P. 76° C. at 0.25 mm.; $n_D^{26}$ 1.5498.

*Analysis.*—Calcd. for $C_{11}H_{17}NS$: C, 67.63; H, 8.77; N, 7.17; S, 16.42. Found: C, 67.73; H, 8.66; N, 6.63; S, 16.05. U.V. (ethanol) 225 mμ (ε=12,900); 284 mμ (ε=6,800).

Following the procedure of Example 4 but using in place of triethyloxonium fluoroborate, trimethyloxonium fluoroborate; tripropyloxonium fluoroborate; triisopropyloxonium fluoroborate; tributyloxonium fluoroborate; and triisbutyloxonium fluoroborate, there are obtained 2-methylthio-3,5,7-trimethyl-3H-azepine; 2-propylthio-3,5,7-trimethyl-3H-azepine; 2-isopropylthio-3,5,7-trimethyl-3H-azepine; 2-butylthio-3,5,7-trimethyl-3H-azepine; and 2-isobutylthio-3,5,7-trimethyl-3H-azepine, respectively.

Following the procedure of Example 4 but substituting for the particular combination of triethyloxonium fluoroborate and 1,3-dihydro-3,5,7-trimethyl-2H-azepine-2-thione used therein, trimethyloxonium fluoroborate plus 1,3-dihydro-3,7-dimethyl-2H-azepine-2-thione; triethyloxonium fluoroborate plus 1,3-dihydro-3,7-diethyl-2H- azepine-2-thione; tripropyloxonium fluoroborate plus 1,3-dihydro-3,7-dipropyl-2H-azepine-2-thione; triisopropyloxonium fluoroborate plus 1,3-dihydro-3,7-diisopropyl-2H-azepine-2-thione; tributyloxonium fluoroborate plus 1,3-dihydro-3,7-dibutyl-2H-azepine-2-thione; triisobutyloxonium fluoroborate plus 1,3-dihydro-3,5,7-triethyl-2H-azepine-2-thione; trimethyloxonium fluoroborate plus 1,3-dihydro-3,7-dimethyl-5-ethyl-2H-azepine-2-thione; triethyloxonium fluoroborate plus 1,3-dihydro-5-tert-butyl-3,7-dimethyl-2H-azepine-2-thione; tripropyloxonium fluoroborate plus 3,7-diisopropyl-5-methyl-2H-azepine-2-thione; and triisopropyloxonium fluoroborate plus 1,3-dihydro-5-sec-butyl-3,7-dimethyl-2H-azepine-2-thione, there are obtained 2-methylthio-3,7-dimethyl-3H-azepine; 2-ethylthio-3,7-diethyl-3H-azepine; 2-propylthio-3,7-dipropyl-3H-azepine; 2-isopropylthio-3,7-diisopropyl-3H-azepine; 2-butylthio-3,7-dibutyl-3H-azepine; 2-isobutylthio-3,5,7-triethyl-3H-azepine; 2-methylthio-3,7-dimethyl-5-ethyl-3H-azepine; 2-ethylthio-5-tert-butyl-3,7-dimethyl-3H-azepine; 2-propylthio-3,7-diisopropyl-5-methyl-3H-azepine; and 2-isopropylthio-5-sec-butyl-3,7-dimethyl-3H-azepine, respectively.

*Example 5.—2-piperidino-3,5,7-trimethyl-3H-azepine*

A mixture of 2-ethoxy-3,5,7-trimethyl-3H-azepine (14.0 g.; 0.076 mole) and piperidine (17 g.; 0.2 mole) was refluxed by heating with a 140–150° C. oil bath for about 120 hours. The resulting reaction mixture was distilled at reduced pressure. After distillation of the excess piperidine, distillation of the residual oil gave 8.2 g. of 2-ethoxy-3,5,7-trimethyl-3H-azepine starting material (B.P. 59–62° C. at 1.3 mm.), and 5.1 g. of 2-piperidino-3,5,7-trimethyl-3H-azepine in the form of a pale yellow oil; B.P. 105–112° C. at 1.3 mm.

A 50% solution of 70% aqueous perchloric acid in ethanol was added dropwise to a solution of 2-piperidino-3,5,7-trimethyl-3H-azepine in diethyl ether until the pH of the mixture was 3. The solid which precipitated was filtered and recrystallized 3 times from a mixture of ethanol and diethyl ether to give 2-piperidino-3,5,7-trimethyl-3H-azepine perchloric acid addition salt in the form of white platelets; M.P. 156–157° C.

*Analysis.*—Calcd. for $C_{14}H_{23}ClN_2O_4$: C, 52.74; H, 7.27; N, 8.79. Found: C, 52.54; H, 7.25; N, 9.14. U.V. (ethanol) 225 m$\mu$ ($\epsilon$=13,450); 276 m$\mu$ ($\epsilon$=8,850).

Using hydrogen chloride and cyclohexanesulfamic acid in place of 70% perchloric acid, the hydrochloric acid and cyclohexanesulfamic acid addition salts of 2-piperidino-3,5,7-trimethyl-3H-azepine were obtained.

Following the procedure of Example 5 but substituting for the piperidine, dibutylamine; dihexylamine; dioctylamine; N-methylheptylamine; 2-butylaziridine; 2-octylazetidine; 2,2-dimethylpyrrolidine; 3-butylpyrrolidine; 2-methyl-5-ethyl-piperidine; and hexahydroazepine, there are obtained 2-dibutylamino-3,5,7-trimethyl-3H-azepine; 2-dihexylamino-3,5,7-trimethyl-3H-azepine; 2-dioctylamino-3,5,7-trimethyl - 3H - azepine; 2 - N - methylheptylamino - 3,5,7-trimethyl-3H-azepine; 2-(2-butyl-1-aziridinyl)-3,5,7-trimethyl-3H-azepine; 2-(2-octyl-1-azetidinyl)-3,5,7-trimethyl - 3H - azepine; 2 - (2,2 - dimethyl - 1 - pyrrolidinyl)-3,5,7 - trimethyl - 3H - azepine; 2 - (3 - butyl - 1 - pyrrolidinyl)-3,5,7-trimethyl-2H-azepine; 2-(2-methyl-5-ethylpiperidino)-3,5,7-trimethyl-3H-azepine; and 2-(1-hexahydroazepinyl)-3,5,7-trimethyl-3H-azepine, respectively.

Also following the procedure of Example 5 but substituting for piperidine, each of the other specific di-lower-alkylamines and heterocyclic amines mentioned above, there are obtained the corresponding 2-amino-substituted 3,5,7-trimethyl-3H-azepines.

Following the procedure of Example 5, each of the above 2-amino-substituted 3,5,7-trimethyl-3H-azepines is transformed to the corresponding perchloric acid, hydrochloric acid, and cyclohexanesulfamic acid addition salts. Substituting for perchloric acid, sulfuric acid, phosphoric acid, benzoic acid, and salicylic acid, the corresponding acid addition salts are obtained.

Following the procedure of Example 5 but substituting for the particular combination of 2-ethoxy-3,5,7-trimethyl-3H-azepine and piperidine used therein, each of the other specific 2-alkoxy-3H-azepines and each of the specific di-lower-alkylamines and heterocyclic amines mentioned above, there are obtained the corresponding 2-amino-substituted 3H-azepines. Also following the procedure of Example 5, each of these 2-amino-substituted 3H-azepines is transformed to the corresponding perchloric acid, hydrochloric acid, sulfuric acid, phosphoric acid, benzoic acid, salicylic acid, and cyclohexanesulfamic acid addition salts.

*Example 6.—2-piperidino-3,5,7-trimethyl-3H-azepine*

Following the procedure of Example 5 but substituting for the 2-ethoxy-3,5,7-trimethyl-3H-azepine, 2-ethylthio-3,5,7-trimethyl-3H-azepine, there was obtained 2-piperidino-3,5,7-trimethyl-3H-azepine and the corresponding perchloric acid addition salt, both with substantially the same characteristic physical properties as recited in Example 5.

Following the procedure of Example 6 but substituting for the specific combination of 1-ethylthio-3,5,7-trimethyl-3H-azepine and piperidine, each of the other 2-alkylthio-3H-azepines and di-lower-alkylamines and heterocyclic amines mentioned above, there are obtained the corresponding 2-amino-substituted 3H-azepines.

I claim:

1. A compound of the formula:

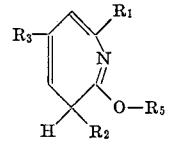

wherein $R_1$, $R_2$, and $R_5$ are alkyl of 1 to 4 carbon atoms, inclusive, and wherein $R_3$ is selected from the group consisting of hydrogen and alkyl of 1 to 4 carbon atoms, inclusive.

2. 2-ethoxy-3,5,7-trimethyl-3H-azepine.

3. A process for producing a 3H-azepine of the formula:

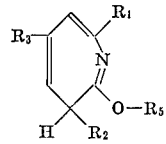

wherein $R_1$, $R_2$, and $R_5$ are alkyl of 1 to 4 carbon atoms, inclusive, and wherein $R_3$ is selected from the group consisting of hydrogen and alkyl of 1 to 4 carbon atoms, inclusive, which comprises the steps, (1) mixing a compound of the formula:

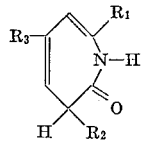

wherein $R_1$, $R_2$, and $R_3$ are as given above, with a trialkyloxonium fluoroborate wherein the alkyls each contain 1 to 4 carbon atoms, inclusive, and (2) mixing the reaction mixture from step (1) with a base, to form said 3H-azepine.

4. A compound of the formula:

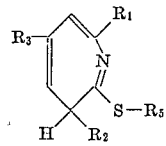

wherein $R_1$, $R_2$, and $R_5$ are alkyl of 1 to 4 carbon atoms, inclusive, and wherein $R_3$ is selected from the group consisting of hydrogen and alkyl of 1 to 4 carbon atoms, inclusive.

5. 2-ethylthio-3,5,7-trimethyl-3H-azepine.

6. A process for producing a 3H-azepine of the formula:

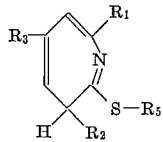

wherein $R_1$, $R_2$, and $R_5$ are alkyl of 1 to 4 carbon atoms, inclusive, and wherein $R_3$ is selected from the group consisting of hydrogen and alkyl of 1 to 4 carbon atoms, inclusive, which comprises the steps, (1) mixing a compound of the formula:

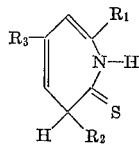

wherein $R_1$, $R_2$, and $R_3$ are as given above, with a trialkyloxonium fluoroborate wherein the alkyls each contain 1 to 4 carbon atoms, inclusive, and (2) mixing the reaction mixture from step (1) with a base, to form said 3H-azepine.

No references cited.

ALEX MAZEL, *Primary Examiner*.

ALTON D. ROLLINS, *Assistant Examiner*.